May 22, 1928.
J. BELL ET AL
1,670,950
VALVE FOR AIR BRAKE SYSTEMS
Filed Jan. 27, 1927
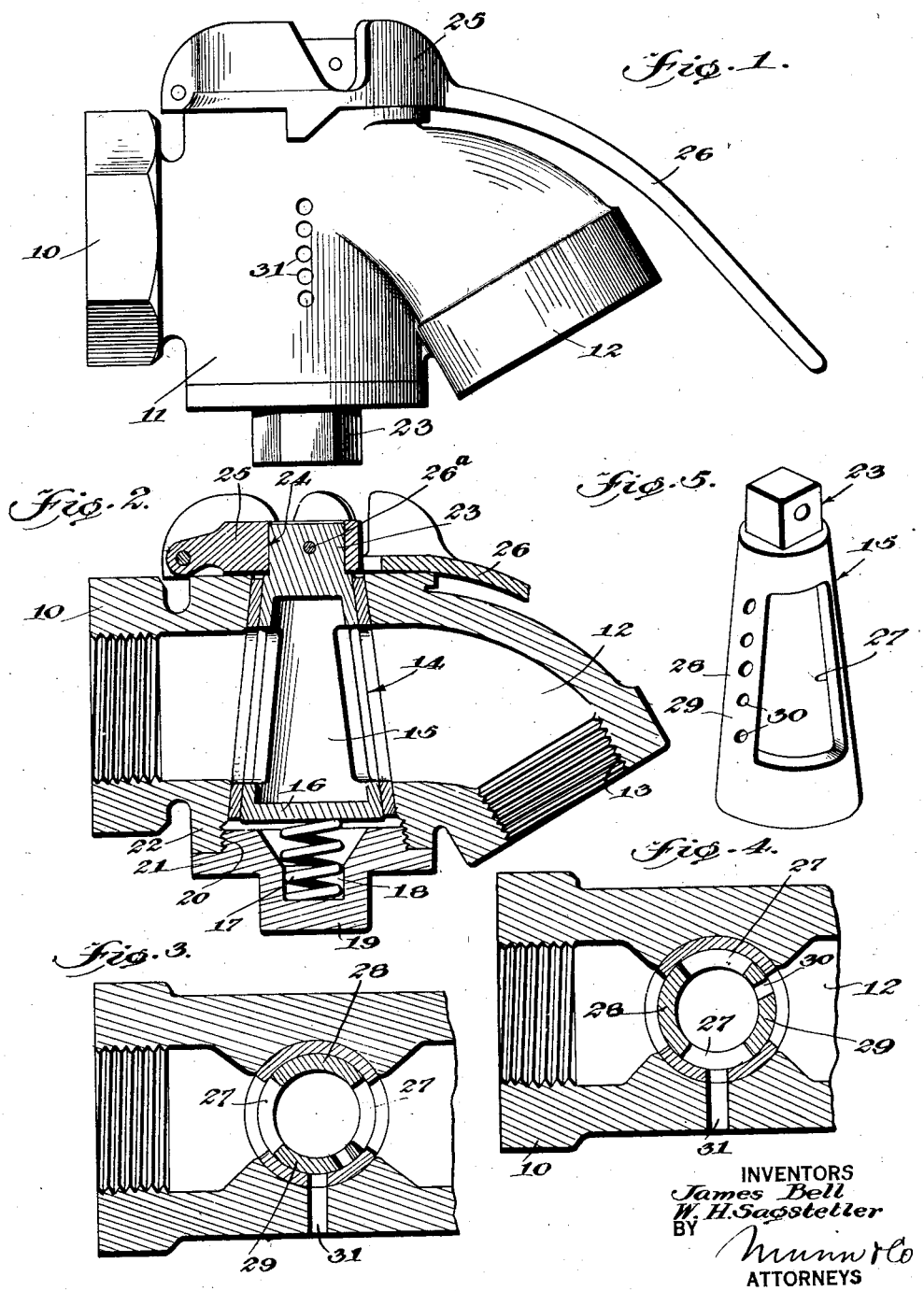
INVENTORS
James Bell
W. H. Sagsteller
BY
Munn & Co
ATTORNEYS Patented May 22, 1928.

1,670,950

UNITED STATES PATENT OFFICE.

JAMES BELL AND WILLIAM H. SAGSTETLER, OF MONTPELIER, OHIO.

VALVE FOR AIR-BRAKE SYSTEMS.

Application filed January 27, 1927. Serial No. 164,017.

This invention relates to valves employed in air brake systems of locomotives and cars.

An object of the invention is the provision of an angle valve which will provide for a safer handling of trains either during movement of the trains or when it is necessary to disconnect the air brake pipes of the train when making repairs.

Another object of the invention is the provision of an angle valve adapted to be employed in connection with air brake systems for the purpose of retaining, cutting out or admitting air from certain portions of a train and in which the air in a portion of the system may be released automatically and when the air is intended to be retained in the remaining portion of the system.

Another object of the invention is the provision of an angle valve adapted to be employed in an air brake system for cutting out a portion of the system while permitting the air in the portion of the system which has been cut out to automatically escape, thus causing the brakes to be applied and give warning that the air pressure has been decreased in a part of the system.

Another object of the invention is the provision of a safety angle valve that will permit cutting out a portion of the air brake system as applied to one or more cars of a train while permitting the air to drain from the cut-off section of the train and thus avoiding the possibility of injury to men who uncouple the hose in order to make repairs and thus also avoiding damage to the hose and couplings when being drawn apart.

Another object of the invention is the provision of a safety angle valve which when closed will permit the air to drain out of the air brake system of the section which has been cut off, thus permitting the brakes to automatically set and give warning to the train crew that the whole system is not in working order, thus tending to eliminate wrecks which are often caused by the malicious cutting out of a train line by turning of the ordinary angle valve.

A further object of the invention is the provision of a safety angle valve which will not only permit air to drain out of a section of the air brake system which has been cut off by the operation of the valve but which will also aid in draining water and foreign matter from the train line and thereby assist in maintaining a good operating condition of the system, the draining in this case being due to the fact that the air hose couplings and valves are located at the lowest point in the train line or brake pipe, the escaping air aiding in forcing the foreign matter from the train line when the valve has been closed, thus preventing the dangerous restriction of the flow of air in the brake pipe.

A still further object of the invention is the provision of a safety angle valve adapted to be employed in air brake systems whereby it is possible for the trainmen to vent the train line and set the brakes on either the head or rear end of the train from any car in the train, thus making it possible for a trainman to act in an emergency from any portion of the train when he is not in reach of the conductor's valve or cannot see the engineer, this feature being particularly useful on such occasions when it is necessary to stop the train due to a hot box, dropping of a brake beam, a cracked wheel, or a bad coupling, it being necessary at such times to act quickly in order to avoid wrecks.

A further object of the invention is the provision of a safety valve which will permit the draining of a portion or all of the air brake system when necessary for applying brakes while at the same time giving warning to the engineer that a part of the air brake system is not in working order so that the engineer will readily stop the train to determine the trouble.

This invention will be best understood from a consideration of the following detailed description, in view of the accompanying drawings forming a part of the specification; nevertheless, it is to be understood that the invention is not confined to the disclosure, being susceptible of such changes and modifications which shall define no material departure from the salient features of the invention as expressed in the appended claim.

Figure 1 is a side view in elevation of an angle valve constructed in accordance with the principles of my invention, Figure 2 is a vertical section of the same, Figure 3 is a horizontal section of the valve showing the valve in open position, Figure 4 is a horizontal section showing the valve in closed position but in position for draining a portion of the air pipe, and Figure 5 is a view in perspective of the valve constructed in accordance with the principles of my invention.

Referring to the drawings 10 designates a threaded nipple of the valve casing 11 adapted to be connected with one part of a pipe line of an air brake system. A second nipple 12 is provided and in communication with the casing 11 and has a threaded connection 13 for placing the nipples in communication with the other part of the air brake system. It will be appreciated that these casings are interpolated at spaced points in the air brake system and at the end of the section or cars of a train for cutting off those portions of the air brake system which is embraced by a car.

The casing is provided with a central conically-shaped chamber 14 in which is located a valve 15 which neatly fits the conical chamber. The lower enlarged end 16 of the valve is engaged by a coil spring 17 seated within a pocket 18 of a plug 19. This plug has a threaded portion 20 adapted to be screwed into a threaded lower end of the valve chamber 14 and has a flange 21 engaging an annular shoulder 22 on the valve casing 11. The plug, as shown at 23, is polygonally-shaped so that it may be engaged by some suitable tool for turning the same.

The upper end of the valve projects through the upper end of the casing and is provided with a squared portion 23 adapted to be received by a similar-shaped opening 24 in the hub 25 of an operating handle 26. The handle is pinned, at 26ª, to the upper end of the valve 15. The handle is curved in such a manner as to be closely associated with the curved nipple 12 of the casing so that it will not be in a position to be accidentally actuated.

The valve 15 is provided with a central passage 27 which when disposed in alignment with the passages in the nipples 10 and 12 will place the opposite portions of the air brake system in communication with each other as shown in Fig. 3, thus providing two curved vertical portions 28 and 29 which form the closing members of the passages as shown in Fig. 4. The side wall 29 is provided with a plurality of perforations 30 which are adapted to place either one of the nipples 10 or 12 in communication with a plurality of passages 31 formed in the side wall of the casing 11, thereby permitting the compressed air in one side of the line to drain out through the openings 31 to the atmosphere when the valve has closed the other side of the line. As shown more particularly in Fig. 4 the passages 30 place the interior of the valve in communication with the nipple 12 while one of the passages 27 places the interior of the valve through the port 31 in communication with the atmosphere.

The operation of our device is as follows: The valves are placed at determined points along the air brake system and in such a relation that it is possible to cut off any car or any series of cars of a train from the remaining portion of the air brake system while permitting the air to drain out of that portion of the system which has been cut off whereby the brakes are automatically set on that portion of the train which has been cut off, thus notifying the engineer that the entire air brake system is not in working condition. By the cutting off of a portion of the air brake system and by draining the cut off portion the connections may be released without danger of destroying the parts of the air brake system or without danger of injuring the employees when attempting to disconnect the sections of the air brake system.

It will be appreciated that the spring 17 maintains the valve in operative relation within its conical seat or passage 14 in the casing 11 so that the various ports will be aligned at predetermined positions of the valve. It is not necessary to make provision for aligning the ports 30 with more than one section of the air brake system since valves are employed at spaced points and one valve is sufficient when placed in closed position to permit draining of the air from the cut off section.

We claim :—

In a device of the character described, a casing having a plurality of passages, a sleeve in the casing having a plurality of passages aligning with the passages in the casing, the interior of the sleeve forming a valve chamber, a hollow valve mounted for rotation in the sleeve and provided with diametrically opposed passages adapted to be aligned with the aligned passages in the sleeve, and casing for placing opposite ends of the casing in communication with the valve chamber, said valve having a plurality of passages adjacent one of the first mentioned passages in the valve, said casing and valve having a plurality of aligned passages for placing the valve chamber in communication with the atmosphere, means for rotating the valve and placing the second mentioned passages in the valve in communication with a pair of the aligned passages in the sleeve of the casing, while placing one of the first mentioned passages in the valve in communication with the aligned passages in the casing and sleeve which are in communication with the atmosphere.

JAMES BELL.
WILLIAM H. SAGSTETLER.